US012689112B2

(12) United States Patent
Jiang et al.

(10) Patent No.: US 12,689,112 B2
(45) Date of Patent: Jul. 21, 2026

(54) ANTENNA STRUCTURE

(71) Applicant: ASUSTeK COMPUTER INC., Taipei (TW)

(72) Inventors: Zhen-De Jiang, Taipei (TW); Pin-Tang Chiu, Taipei (TW)

(73) Assignee: ASUSTEK COMPUTER INC., Taipei City (TW)

( * ) Notice: Subject to any disclaimer, the term of this patent is extended or adjusted under 35 U.S.C. 154(b) by 230 days.

(21) Appl. No.: 18/331,410

(22) Filed: Jun. 8, 2023

(65) Prior Publication Data

US 2024/0128634 A1 Apr. 18, 2024

(30) Foreign Application Priority Data

Oct. 17, 2022 (TW) .................................. 111139334

(51) Int. Cl.
*H01Q 1/22* (2006.01)
*H01Q 1/48* (2006.01)
*H01Q 1/50* (2006.01)

(52) U.S. Cl.
CPC ............. *H01Q 1/2266* (2013.01); *H01Q 1/48* (2013.01); *H01Q 1/50* (2013.01)

(58) Field of Classification Search
CPC ........ H01Q 1/243; H01Q 9/0421; H01Q 1/38; H01Q 5/371; H01Q 9/0442; H01Q 5/378; H01Q 9/0407; H01Q 9/42; H01Q 21/30; H01Q 19/005; H01Q 1/242
See application file for complete search history.

(56) References Cited

U.S. PATENT DOCUMENTS

| | | | | |
|---|---|---|---|---|
| 5,861,854 | A | 1/1999 | Kawahata et al. | |
| 9,054,407 | B2 | 6/2015 | Komura | |
| 11,088,439 | B2 | 8/2021 | Chang et al. | |
| 2004/0090377 | A1* | 5/2004 | Dai .......................... | H01Q 1/38 343/702 |
| 2012/0206302 | A1* | 8/2012 | Ramachandran ........ | H01Q 1/22 343/866 |
| 2022/0376387 | A1* | 11/2022 | Ma ........................... | H01Q 1/42 |
| 2024/0222868 | A1* | 7/2024 | Liu .......................... | H01Q 3/22 |

FOREIGN PATENT DOCUMENTS

| | | | | |
|---|---|---|---|---|
| CN | 1171640 A | 1/1998 | | |
| CN | 103069646 A | 4/2013 | | |
| EP | 1102346 A1 * | 5/2001 | ........... | H01Q 1/2283 |
| TW | 201143206 A | 12/2011 | | |
| TW | 523313 B | 2/2016 | | |
| TW | I523313 B | 2/2016 | | |
| TW | 202123533 A | 6/2021 | | |
| TW | 202207520 A | 2/2022 | | |

* cited by examiner

*Primary Examiner* — Wei (Victor) Y Chan
(74) *Attorney, Agent, or Firm* — McClure, Qualey & Rodack, LLP

(57) ABSTRACT

An antenna structure is provided, which is disposed in a clearance area in a casing of an electronic device, and a magnetic element is arranged in the clearance area. The antenna structure includes an antenna radiator, a feeding contact and a grounding portion. The antenna radiator is located on the magnetic element and includes a first connection end and a second connection end. The feeding contact is electrically connected to the first connection end of the antenna radiator to transmit and receive a radio frequency signal. The grounding portion is located in the clearance area and connected to the second connection end of the antenna radiator.

9 Claims, 6 Drawing Sheets

ANTENNA STRUCTURE

CROSS-REFERENCE TO RELATED APPLICATION

This application claims the priority benefit of Taiwan Application Serial No. 111139334, filed on Oct. 17, 2022. The entirety of the above-mentioned patent application is hereby incorporated by reference herein and made a part of the specification.

BACKGROUND OF THE INVENTION

Field of the Invention

The disclosure relates to an antenna structure that is effectively combined with a magnetic element.

Description of the Related Art

In recent years, with higher requirements on hardware configuration of notebook computers and novel appearance designs of the notebook computers, such as full-metal frames and narrower frames, less space is available for antenna designs.

Using a notebook computer with a plastic body as an example, antennas are usually designed in limited space of a lower frame of a base (part A, B) and a screen frame (part C, D). Using a notebook computer with a metal body as an example, antenna radiation is easily affected by environment. Therefore, for the antenna design in the full-metal body, an effective antenna clearance area needs to be provided, such as an antenna window or the design using a slot antenna, so as to maximize antenna efficiency. However, the environment for the previous antenna design generally avoids magnetic elements/metal materials because such materials affect the antenna efficiency. In addition, the antenna designs have different antenna sizes according to different operating frequency bands. Therefore, the space for the antenna designs is usually limited, and space utilization of the antennas cannot be improved.

BRIEF SUMMARY OF THE INVENTION

The disclosure provides an antenna structure, arranged in a clearance area in a casing of an electronic device, where a magnetic element is arranged in the clearance area. The antenna structure includes an antenna radiator, a feeding contact and a grounding portion. The antenna radiator is located on the magnetic element and includes a first connection end and a second connection end. The feeding contact is electrically connected to the first connection end of the antenna radiator to transmit and receive a radio frequency signal. The grounding portion is located in the clearance area and connected to the second connection end of the antenna radiator.

The disclosure further provides an antenna structure, arranged in a clearance area in a casing of an electronic device, including an iron antenna grounding plane, an iron antenna, a feeding contact and a grounding portion. The iron antenna grounding plane is located in the clearance area. The iron antenna is located on the iron antenna grounding plane, where one end of the iron antenna includes a first connection end, and a magnetic element is arranged above the iron antenna. The feeding contact is electrically connected to the first connection end of the iron antenna to transmit and receive a radio frequency signal. The grounding portion is located in the clearance area and connected to the iron antenna grounding plane.

In conclusion, the disclosure provides an antenna structure which effectively combines an antenna design with a magnetic element, and uses the magnetic element as an antenna overlapping portion or an antenna radiation portion to reduce a size of the antenna design, improve space utilization of the antenna, and maintain a good antenna radiation capability, thereby providing good antenna radiation efficiency in supported frequency bands.

DETAILED DESCRIPTION OF THE EMBODIMENTS

Figure 1:
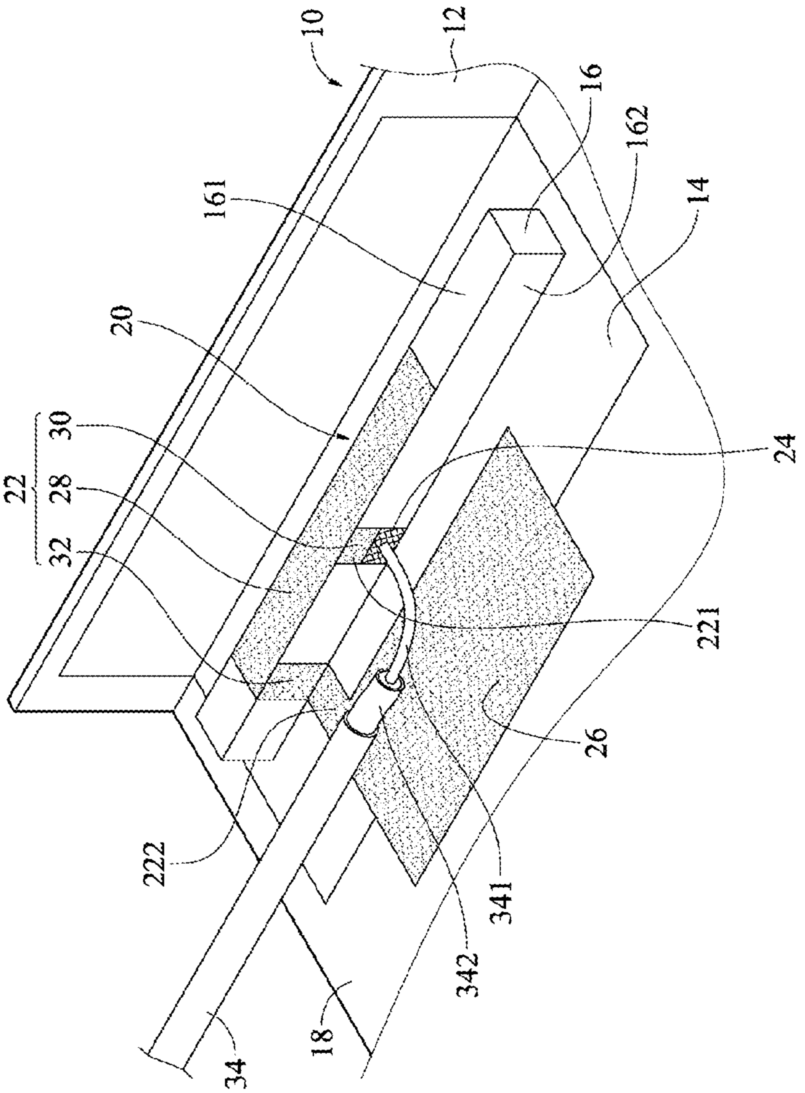
FIG. 1 is a schematic structural diagram of an antenna structure according to a first embodiment of the disclosure.

Embodiments of the disclosure are described below with reference to relevant drawings. In addition, some of elements or structures are omitted in the drawings in the embodiments to clearly show technical features of the disclosure. In these drawings, the same reference numerals represent the same or similar elements or circuits. It is to be understood that although the terms “first”, “second”, and the like in this specification are used to describe various elements, components, regions or functions, these elements, components, regions and/or functions are not limited by these terms. These terms are only used to distinguish one element, component, region or function from another element, component, region or function.

Referring to FIG. 1, an antenna structure is arranged in a clearance area 14 in a casing 12 of an electronic device 10, where a magnetic element 16 is arranged in the clearance area 14, and the clearance area 14 is a plastic material area (non-conductive area) in the casing 12 of the electronic device 10. In an embodiment, the magnetic element 16 is a bar magnet. The antenna structure 20 includes an antenna radiator 22, a feeding contact 24 and a grounding portion 26. In the antenna structure 20, the antenna radiator 22 is located on the magnetic element 16, and includes a first connection end 221 and a second connection end 222; the feeding contact 24 is electrically connected to the first connection end 221 of the antenna radiator 22 to transmit and receive a radio frequency signal; and the grounding portion 26 is located in the clearance area 14 and connected to the second connection end 222 of the antenna radiator 22, so that the antenna radiator 22 is grounded through the grounding portion 26.

In an embodiment, the antenna radiator 22 includes one of a planar inverted F-shaped antenna (PIFA), a dipole antenna, or a loop antenna.

As shown in FIG. 1, in the antenna structure 20, the antenna radiator 22 further includes a metal radiation portion 28, a first metal branch 30 and a second metal branch 32. The metal radiation portion 28 is located on a first surface 161 of the magnetic element 16. One end of the first metal branch 30 is vertically connected to a middle position of the metal radiation portion 28, and another end extends to a second surface 162 of the magnetic element 16 adjacent to the first surface 161 to serve as the first connection end 221, so that the first metal branch 30 is connected to the feeding contact 24 through the first connection end 221. One end of the second metal branch 32 is vertically connected to a tail end of the metal radiation portion 28, and another end extends to the clearance area 14 through the second surface 162 to serve as the second connection end 222 to connect to the grounding portion 26. In addition, the antenna structure 20 further includes a signal line 34, which is usually a coaxial cable. The signal line 34 includes a signal end 341 and a grounding end 342. The signal end 341 is electrically connected to the feeding contact 24, and the grounding end 342 is electrically connected to the grounding portion 26, so that the antenna structure 20 is connected to a radio frequency circuit at a rear end through the signal line 34. In this embodiment, the metal radiation portion 28, the first metal branch 30 and the second metal branch 32 form a PIFA. Therefore, the antenna radiator 22 is designed as the PIFA. The antenna radiator 22 is combined with the magnetic element 16. The magnetic element 16 is used as an antenna overlapping portion, so that the antenna structure 20 still maintains certain radiation efficiency, and the length of the metal branch is effectively reduced.

In an embodiment, the grounding portion 26 further extends outside the clearance area 14 to be connected to a system grounding plane 18. In this embodiment, the system grounding plane 18 is a metal plane located in the casing 12 of the electronic device 10. In another embodiment, the system grounding plane 18 is an independent metal sheet. In an embodiment, the system grounding plane 18 is a metal sheet or a sputtered metal portion inside a metal casing of the electronic device 10 or a plastic casing of the electronic device 10, but the disclosure is not limited thereto. In an embodiment, when the electronic device 10 is a notebook computer, the system grounding plane 18 is a system grounding portion of a casing of the notebook computer or a metal portion such as an EMI aluminum foil or a sputtered metal area inside the casing of the notebook computer.

Figure 2:
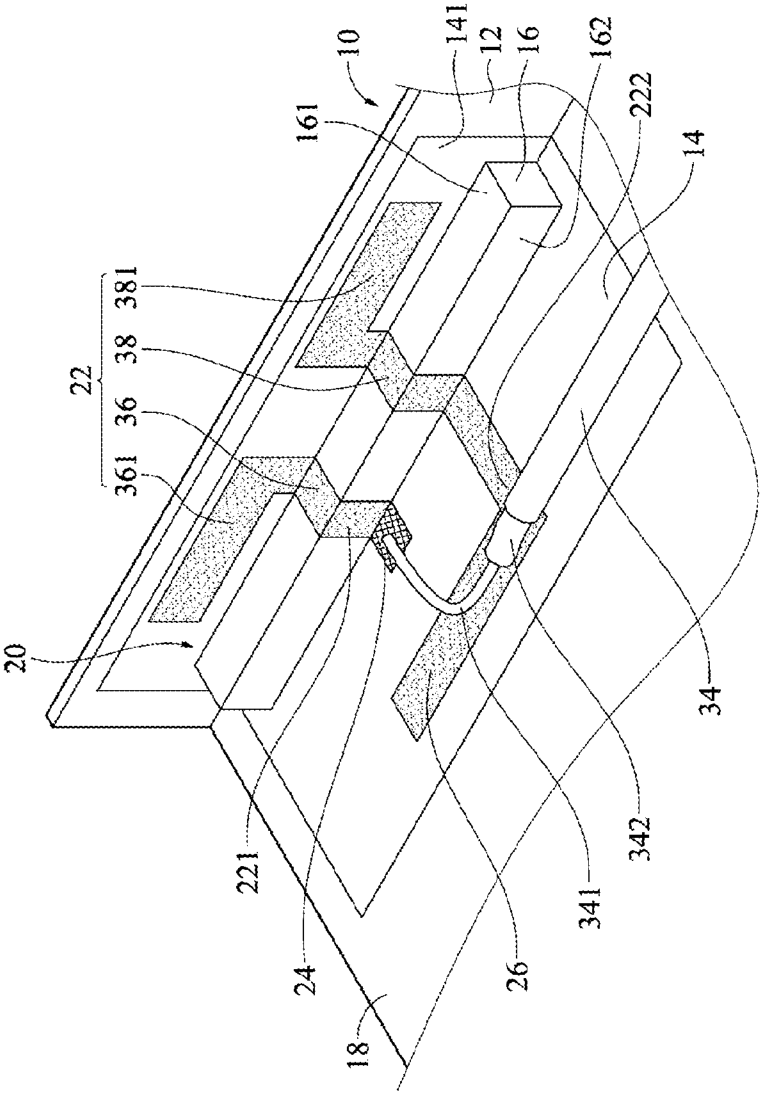
FIG. 2 is a schematic structural diagram of an antenna structure according to a second embodiment of the disclosure.

Referring to FIG. 2, the antenna structure 20 includes an antenna radiator 22, a feeding contact 24 and a grounding portion 26. In the antenna structure 20, the antenna radiator 22 is located on the magnetic element 16, and further includes a third metal branch 36 and a fourth metal branch 38. One end of the third metal branch 36 is located on a first surface 161 of the magnetic element 16, continues to extend upward to a side wall 141 of the clearance area 14, and includes at least one first bending portion 361; another end of the third metal branch 36 extends to a second surface 162 of the magnetic element 16 adjacent to the first surface 161 to serve as the first connection end 221, so that the third metal branch 36 is connected to the feeding contact 24 by using the first connection end 221. One end of the fourth metal branch 38 is located on the first surface 161 of the magnetic element 16, continues to extend upward to the side wall 141 of the clearance area 14, and includes at least one second bending portion 381; another end of the fourth metal branch 38 extends to the clearance area 14 through the second surface 162 to serve as the second connection end 222 to connect to the grounding portion 26. In an embodiment, the third metal branch 36 and the first bending portion 361 thereof and the fourth metal branch 38 and the second bending portion 381 thereof are designed as symmetrical metal branch structures. In addition, the antenna structure 20 further includes a signal line 34 including a signal end 341 and a grounding end 342. The signal end 341 is electrically connected to the feeding contact 24, and the grounding end 342 is electrically connected to the grounding portion 26, so that the antenna structure 20 is connected to a radio frequency circuit at a rear end through the signal line 34. In this embodiment, the third metal branch 36 and the fourth metal branch 38 form a dipole antenna. Therefore, the antenna radiator 22 is designed as the dipole antenna. The antenna radiator 22 is combined with the magnetic element 16. The magnetic element 16 is used as an antenna overlapping portion, so that the antenna structure 20 still maintains certain radiation efficiency, and the length of the metal branch is effectively reduced.

Figure 3:
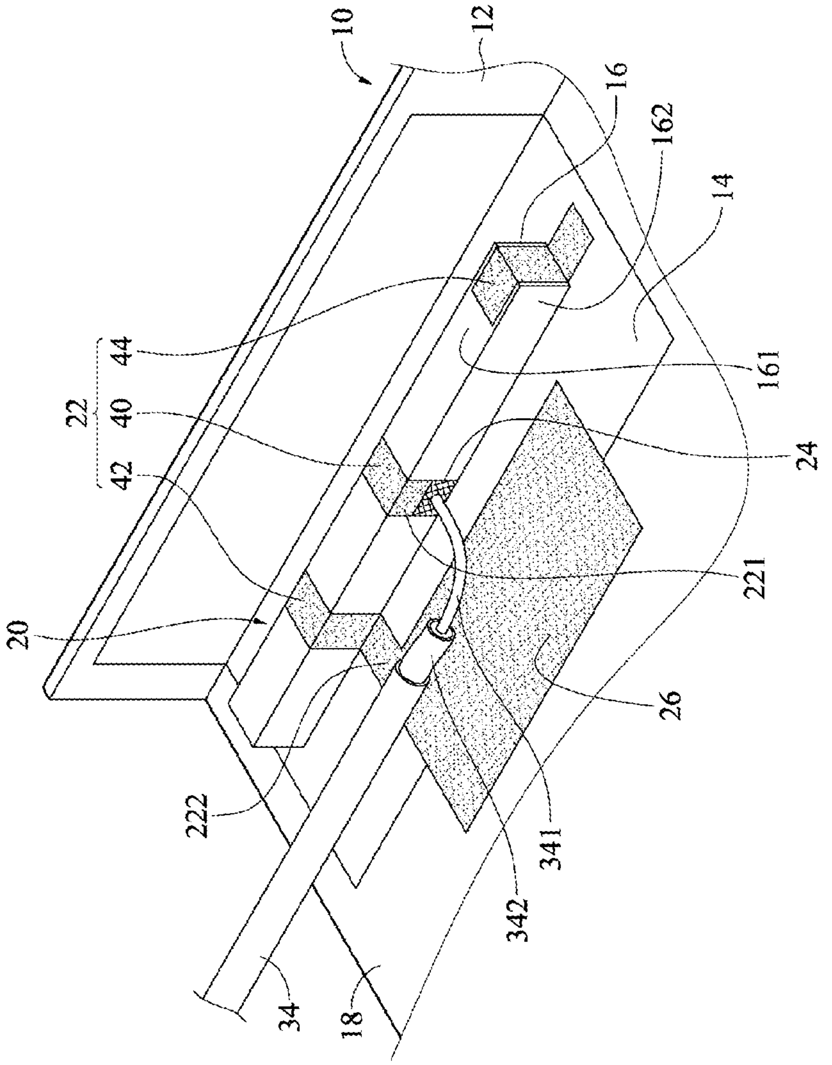
FIG. 3 is a schematic structural diagram of an antenna structure according to a third embodiment of the disclosure.

Referring to FIG. 3, the antenna structure 20 includes an antenna radiator 22, a feeding contact 24 and a grounding portion 26. In the antenna structure 20, the antenna radiator 22 is located on the magnetic element 16, and further includes a fifth metal branch 40, a sixth metal branch 42 and an extended radiation portion 44. One end of the fifth metal branch 40 is located on a first surface 161 of the magnetic element 16, and another end of the fifth metal branch 40 extends to a second surface 162 of the magnetic element 16 adjacent to the first surface 161, to serve as the first connection end 221, so that the fifth metal branch 40 is connected to the feeding contact 24 by using the first connection end 221. The sixth metal branch 42 is located on one side of the fifth metal branch 40. One end of the sixth metal branch 42 is located on the first surface 161 of the magnetic element 16, and another end extends to the clearance area 14 through the second surface 162 of the magnetic element 16 to serve as the second connection end 222 to connect to the grounding portion 26. The extended radiation portion 44 is located on another side of the fifth metal branch 40. One end of the extended radiation portion 44 is located on a tail end of the first surface 161 of the magnetic element 16, and another end extends downward to the clearance area 14 through an end surface of the magnetic element 16, so that the magnetic element 16 is used as a part of the antenna radiator 22. The grounding portion 26 further extends outside the clearance area 14 to connect to the system grounding plane 18. In addition, the antenna structure 20 further includes a signal line 34 including a signal end 341 and a grounding end 342. The signal end 341 is electrically connected to the feeding contact 24, and the grounding end 342 is electrically connected to the grounding portion 26, so that the antenna structure 20 is connected to a radio frequency circuit at a rear end through the signal line 34. In this embodiment, the fifth metal branch 40, the sixth metal branch 42, the extended radiation portion 44 and the magnetic element 16 form a PIFA. Therefore, the antenna structure 20 is designed as the PIFA. The magnetic element 16 cooperates with the antenna radiator 22 to serve as a part of an antenna radiation portion, so that the antenna structure 20 still maintains certain radiation efficiency by using the magnetic element 16 as the antenna radiation portion.

In an embodiment, the metal radiation portion 28, the first metal branch 30 and the second metal branch 32 shown in FIG. 1, the third metal branch 36 (including the first bending portion 361) and the fourth metal branch 38 (including the second bending portion 381) shown in FIG. 2, and the fifth metal branch 40, the sixth metal branch 42 and the extended radiation portion 44 shown in FIG. 3 are made of conductive metal materials, such as silver, copper, aluminum, iron or alloys thereof, but the disclosure is not limited thereto.

Figure 4:
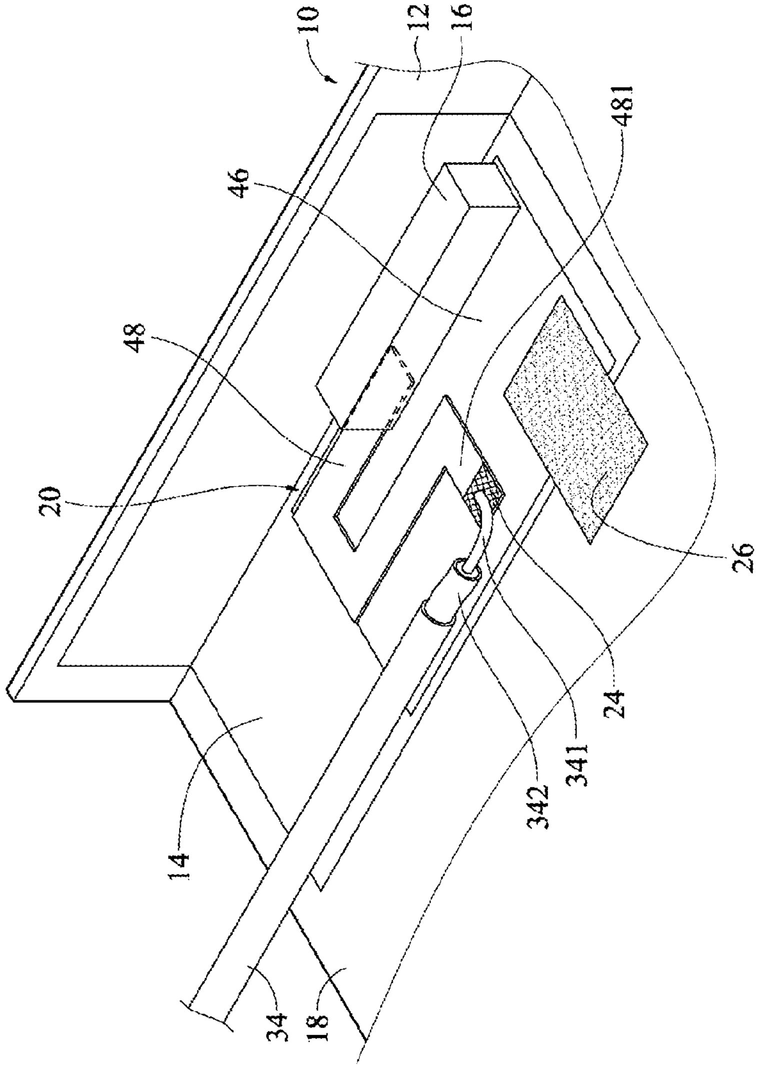
FIG. 4 is a schematic structural diagram of an antenna structure according to a fourth embodiment of the disclosure.

Referring to FIG. 4, an antenna structure 20 is arranged in a clearance area 14 in a casing 12 of an electronic device 10. The antenna structure 20 includes an iron antenna grounding plane 46, an iron antenna 48, a feeding contact 24 and a grounding portion 26. In the antenna structure 20, the iron antenna grounding plane 46 is located in the clearance area 14, and the iron antenna 48 is located on the iron antenna grounding plane 46. One end of the iron antenna 48 includes a first connection end 481, and a magnetic element 16 is arranged above another end of the iron antenna 48, so that the magnetic element 16 is adsorbed on the iron antenna 48. The feeding contact 24 is electrically connected to the first connection end 481 of the iron antenna 48 to transmit and receive a radio frequency signal. The grounding portion 26 is located in the clearance area 14 and connected to the iron antenna grounding plane 46, where the grounding portion 26 further extends outside the clearance area 14 to connect to a system grounding plane 18. In addition, the antenna structure 20 further includes a signal line 34 including a signal end 341 and a grounding end 342. The signal end 341 is electrically connected to the feeding contact 24, and the grounding end 342 is electrically connected to the iron antenna grounding plane 46, so that the antenna structure 20 is connected to a radio frequency circuit at a rear end through the signal line 34. In this embodiment, a magnetic element 16 is directly adsorbed on an iron antenna 48 in the disclosure, which not only effectively reduces the length of the iron antenna 48, but also maintains a good antenna radiation capability.

In an embodiment, the foregoing electronic device 10 is a notebook computer, but the disclosure is not limited thereto. Any electronic device 10 with a mobile communication function and a magnetic element design falls within the disclosure. In an embodiment, when the electronic device 10 is a notebook computer, a casing 12 is a bottom casing (commonly known as part D) of the notebook computer, and a clearance area 14 is a plastic material area (non-conductive area) inside the bottom casing.

Figure 5:
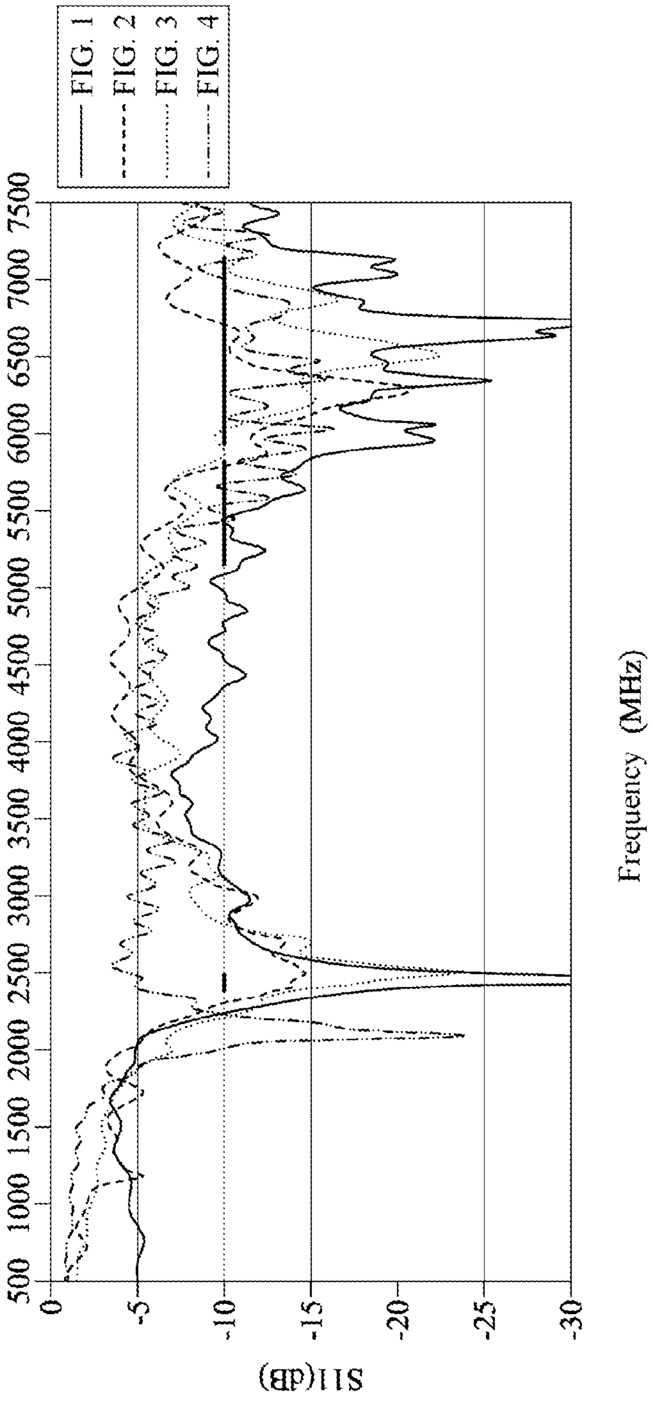
FIG. 5 is a schematic simulation diagram of parameter S generated by an antenna structure under different frequencies according to the disclosure.
Figure 6:
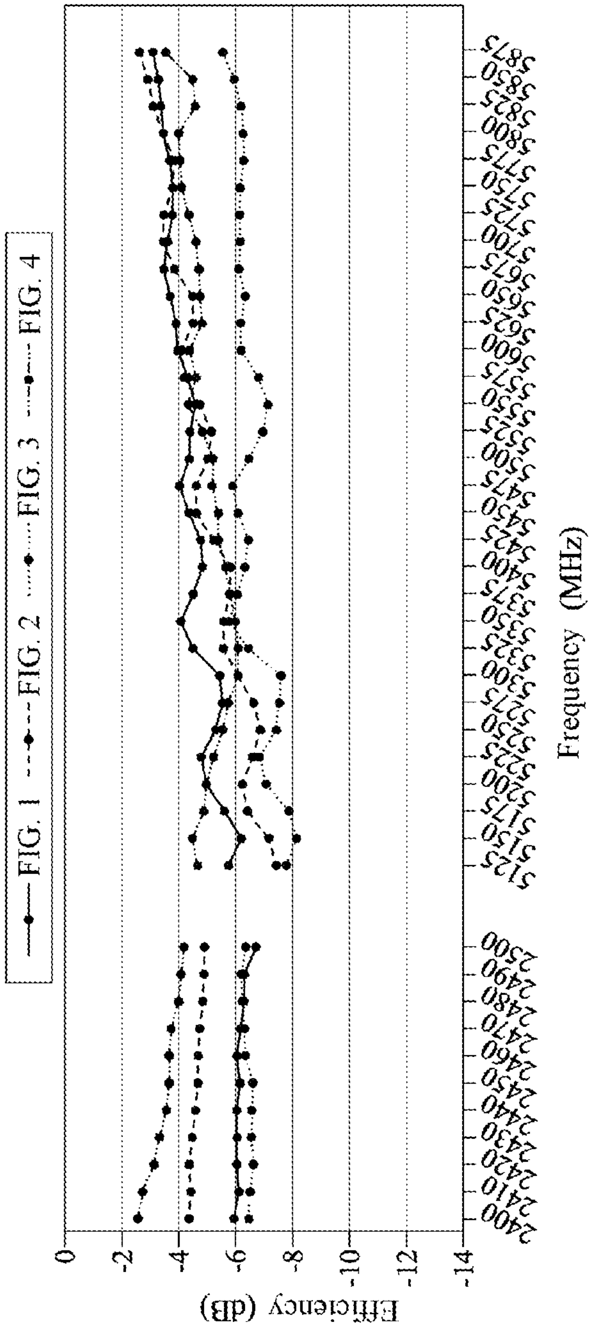
FIG. 6 is a schematic simulation diagram of radiation efficiency of an antenna structure under different frequencies according to the disclosure.

The antenna structure 20 proposed in the disclosure really has a good reflection coefficient and high radiation efficiency. Referring to FIG. 1 to FIG. 4, for each antenna structure 20, a simulation analysis of parameter S (S11) and an antenna efficiency simulation are performed when the radio frequency signal is transmitted. Simulation results of parameter S of the antenna structure 20 in a low operating frequency band and a high operating frequency band are shown in FIG. 5. From the curves shown in the figure, reflection coefficients (S11) shown in the figure are less than −5 dB (S11<−5 dB), which proves that the antenna structures 20 shown in FIG. 1 to FIG. 4 have good reflection coefficients in the low operating frequency band and the high operating frequency band, and meet a wide-frequency band range of 2400 MHz-2500 MHz and 5000 MHz-7000 MHz. On the other hand, as shown in FIG. 6, the antenna radiation efficiency of the antenna structures 20 shown in FIG. 1 to FIG. 4 is also good under different operating frequency bands. Therefore, the antenna structure 20 in the disclosure has good antenna performance in both the low operating frequency band and the high operating frequency band.

To improve space utilization of an antenna design, in the disclosure, the antenna is designed on a magnetic element, so that the antenna is combined with the magnetic element, or an antenna branch is replaced by the magnetic element, thereby effectively reducing a size of the antenna design, enabling the antenna to maintain a good radiation capacity, and breaking through the previous antenna design thinking that the antenna conflicts with the magnetic element. In an embodiment, if an antenna branch of 2.4 GHz is λ, in the disclosure, the antenna is combined with the magnetic element, so that the magnetic element becomes an antenna structure for radiation, causing the length of the original antenna branch λ to be effectively reduced by at least 30%, which reduces the size of the original antenna design, greatly improves the space utilization of the antenna, and also maintains the good antenna radiation capacity.

In conclusion, the disclosure provides an antenna structure which effectively combines an antenna design with a magnetic element, and uses the magnetic element as an antenna overlapping portion or an antenna radiation portion to reduce a size of the antenna design, improve space utilization of the antenna, and maintain a good antenna radiation capability, thereby providing good antenna radiation efficiency in supported frequency bands.

The embodiments described above are only used for describing the technical ideas and characteristics of the disclosure, and are intended to enable a person skilled in the art to understand and implement the content of the disclosure. However, the patent scope of the disclosure is not limited thereto. That is, any equivalent change or modification made according to the spirit disclosed in the disclosure shall still fall within the patent scope of the disclosure.

What is claimed is:

1. An antenna structure, arranged in a clearance area in a casing of an electronic device, wherein a magnetic element is arranged in the clearance area, and the antenna structure comprises:

an antenna radiator, located on the magnetic element and comprising a first connection end and a second connection end;

a feeding contact, electrically connected to the first connection end of the antenna radiator to transmit and receive a radio frequency signal; and a grounding portion, located in the clearance area and connected to the second connection end of the antenna radiator, wherein the antenna radiator further comprises:

a metal radiation portion, located on a first surface of the magnetic element;

a first metal branch, comprising one end connected to the metal radiation portion and another end extending to a second surface of the magnetic element adjacent to the first surface to serve as the first connection end, so as to be connected to the feeding contact by using the first connection end; and a second metal branch, comprising one end connected to the metal radiation portion and another end extending to the clearance area through the second surface to serve as the second connection end to connect to the grounding portion.

2. The antenna structure according to claim 1, wherein the grounding portion further extends outside the clearance area to be connected to a system grounding plane.

3. The antenna structure according to claim 1, wherein the antenna radiator comprises one of a planar inverted F-shaped antenna (PIFA), a dipole antenna, or a loop antenna.

4. The antenna structure according to claim 1, wherein the antenna radiator further comprises:

a third metal branch, comprising one end located on a first surface of the magnetic element and another end extending to a second surface of the magnetic element adjacent to the first surface to serve as the first connection end, so as to be connected to the feeding contact by using the first connection end; and a fourth metal branch, comprising one end located on the first surface of the magnetic element and another end extending to the clearance area through the second surface to serve as the second connection end to connect to the grounding portion.

5. The antenna structure according to claim 4, wherein the end of the third metal branch further extends to a side wall of the clearance area, and comprises at least one first bending portion; and the end of the fourth metal branch further extends to the side wall of the clearance area, and comprises at least one second bending portion.

6. The antenna structure according to claim 1, wherein the antenna radiator further comprises:

a fifth metal branch, comprising one end located on a first surface of the magnetic element and another end extending to a second surface of the magnetic element adjacent to the first surface to serve as the first connection end, so as to be connected to the feeding contact by using the first connection end;

a sixth metal branch, comprising one end located on the first surface of the magnetic element and another end extending to the clearance area through the second surface to serve as the second connection end to connect to the grounding portion; and an extended radiation portion, comprising one end located at a tail end of the first surface of the magnetic element and another end extending downward to the clearance area, so that the magnetic element is used as a part of the antenna radiator.

7. The antenna structure according to claim 1, further comprising a signal line, wherein the signal line comprises a signal end and a grounding end, the signal end is electrically connected to the feeding contact, and the grounding end is electrically connected to the grounding portion.

8. The antenna structure according to claim 1, wherein the electronic device is a notebook computer.

9. An antenna structure, arranged in a clearance area in a casing of an electronic device, wherein a magnetic element is arranged in the clearance area, and the antenna structure comprises:

an antenna radiator, located on the magnetic element and comprising a first connection end and a second connection end;

a feeding contact, electrically connected to the first connection end of the antenna radiator to transmit and receive a radio frequency signal; and a grounding portion, located in the clearance area and connected to the second connection end of the antenna radiator;

wherein the antenna radiator further comprises:

a metal radiation portion, located on a first surface of the magnetic element;

a first metal branch, comprising one end connected to the metal radiation portion and another end extending to a second surface of the magnetic element adjacent to the first surface to serve as the first connection end, so as to be connected to the feeding contact by using the first connection end; and a second metal branch, comprising one end connected to the metal radiation portion and another end extending to the clearance area through the second surface to serve as the second connection end to connect to the grounding portion.

* * * * *